(12) United States Patent
Martin et al.

(10) Patent No.: US 6,588,117 B1
(45) Date of Patent: Jul. 8, 2003

(54) APPARATUS WITH GYROSCOPES AND ACCELEROMETERS FOR DETERMINING THE ATTITUDES OF AN AERODYNE

(75) Inventors: Nicolas Martin, Bourg-les-Valence (FR); Jean-René Chevalier, Cenon S/Vienne (FR)

(73) Assignee: Thales Avionics S.A., Velizy (FR)

( * ) Notice: Subject to any disclaimer, the term of this patent is extended or adjusted under 35 U.S.C. 154(b) by 0 days.

(21) Appl. No.: 09/889,578

(22) PCT Filed: Jan. 31, 2000

(86) PCT No.: PCT/FR00/00219
§ 371 (c)(1),
(2), (4) Date: Jul. 31, 2001

(87) PCT Pub. No.: WO00/46573
PCT Pub. Date: Aug. 10, 2000

(30) Foreign Application Priority Data

Feb. 2, 1999 (FR) ............................................ 99 01181

(51) Int. Cl.$^7$ .......................... G01C 19/42; G01C 19/44
(52) U.S. Cl. ............................... 33/328; 33/320; 33/322
(58) Field of Search ............................ 33/318, 320, 321, 33/322, 323, 328, 329, 330; 702/141, 142, 143, 144

(56) References Cited

U.S. PATENT DOCUMENTS

| | | | |
|---|---|---|---|
| 3,597,598 A | * 8/1971 | McAlloster et al. | 33/321 |
| 3,974,699 A | * 8/1976 | Morris et al. | 33/328 |
| 3,979,090 A | * 9/1976 | Brickner et al. | 33/321 |
| 4,070,674 A | 1/1978 | Buell et al. | |
| 4,179,818 A | * 12/1979 | Craig | 33/321 |
| 4,608,641 A | * 8/1986 | Snell | 702/144 |
| 4,914,598 A | * 4/1990 | Krogmann et al. | 33/321 |
| 5,297,052 A | * 3/1994 | McIntyre et al. | 33/321 |
| 5,479,161 A | 12/1995 | Keyes et al. | |

OTHER PUBLICATIONS

U.S. patent application Ser. No. 09/806,489, filed Apr. 12, 2001, pending.
U.S. patent application Ser. No. 09/889,578, filed Jul. 31, 2001, pending.

* cited by examiner

Primary Examiner—Diego Gutierrez
Assistant Examiner—Travis Reis
(74) Attorney, Agent, or Firm—Oblon, Spivak, McClelland, Maier & Neustadt, P.C.

(57) ABSTRACT

The invention relates to an apparatus for determining postures, in particular the attitude ($\theta$) and the inclination ($\phi$) of an aerodyne, comprising:

a strap-down gyrometer device providing the components of the vector ($\vec{\Omega}$) of instantaneous rotation of the aerodyne, means for calculating, from gyrometric measurements, a matrix of postures ($\vec{b}_1, \vec{b}_2, \vec{b}_3$), accelerometers integral with the said gyrometric device, and means for comparing data calculated from the accelerometers with data calculated from the gyrometers so as to provide corrections for compensating for the errors or drifts of the gyrometric device.

This apparatus is characterized in that the comparison is performed between a vertically directed vector $\vec{U}_g$ provided by the gyrometric device and a vertically directed vector $\vec{U}_a$ provided by the accelerometers.

19 Claims, 4 Drawing Sheets

FIG_4

FIG_5

FIG_6

APPARATUS WITH GYROSCOPES AND ACCELEROMETERS FOR DETERMINING THE ATTITUDES OF AN AERODYNE

The invention relates to an apparatus for determining the postures of a flying craft.

To fly an aerodyne, it is necessary to know its postures.

The postures are by definition the three Euler angles $\psi$, $\theta$, $\phi$, or, respectively, heading, attitude and inclination, which define the orientation of the reference frame tied to the aerodyne with respect to the local geographical reference frame. The local geographical reference frame (or trihedron) is an orthonormal trihedron one axis of which is along the local vertical (downwards) and whose other two axes are along the local north and east directions. The reference frame tied to the aerodyne is an orthonormal trihedron whose X axis, or axis of roll, is colinear with the fuselage of the aerodyne, whose Y axis, or axis of pitch, is perpendicular to its plane of symmetry, and whose Z axis, or axis of yaw, is included in the plane of symmetry.

The postures are determined with the aid of a so-called strap-down gyrometric device consisting of at least three mutually integral gyrometers integral with the structure of the aircraft. Each of them provides a component, along its axis, of the vector $\vec{\Omega}$ of instantaneous rotation of the aerodyne with respect to an inertial frame of reference. This device makes it possible to measure the three components of $\vec{\Omega}$ in the reference frame X, Y, Z tied to the aerodyne. These components are, respectively, the roll p about the X axis, the pitch q about the Y axis and the yaw r about the Z axis.

These three components are integrated, for example by the so-called method of quaternions. Integration provides quaternions of postures, from which is deduced, with the initial orientation of the aerodyne, a matrix of postures followed by the Euler angles.

The measurement signals delivered by the gyrometers exhibit defects referred to as drifts. Since these signals are integrated, the errors in the postures increase with time. This is why, conventionally, to determine the postures, use is made, in addition to the gyrometers, of accelerometers which are used to correct the results provided by the integration of the signals from the gyrometers. This correction is performed in a slaving loop.

The accelerometers integral with the strap-down gyrometric device can provide, by virtue of gravity, the attitude postures and inclinational of the aerodyne; however the signals which they deliver are marred with errors which make the results difficult to utilize as they stand. Conversely, the combining, in a slaving loop, of the signals provided by gyrometers and accelerometers makes it possible to compensate for the drifts of the gyrometers whilst preserving their advantage which is to provide results with relatively low short-term noise.

In known apparatuses, comparison between the gyrometric and accelerometric signals constitutes a complex operation since the signals from the accelerometers are integrated in such a way as to represent velocities and the latter are compared with references; this comparison serves to formulate the correction of the gyrometric device. Integration calls upon postures emanating from the gyrometric device.

The invention provides an apparatus in which the corrections are performed in a simple and reliable manner.

The apparatus according to the invention is characterized in that the comparison is performed between, on the one hand, a vertically directed vector provided by the gyrometric device and, on the other hand, a vertically directed vector provided by the accelerometers. Preferably, the comparison consists in performing the vector product of these two vectors.

The vertically directed vector provided by the accelerometers is colinear with the acceleration due to gravity, during the phases of unaccelerated rectilinear flight. Thus, it is not necessary to perform an integration of the accelerometric signals. Moreover, in the gyrometric device, the vertically directed vector constitutes the last column of the posture matrix obtained with this device. Furthermore, the two vertically directed vectors can be expressed in the same reference frame tied to the aerodyne.

It is recalled here that the posture matrix is a 3×3 matrix in which the first column represents the direction of north in the XYZ reference frame of the aerodyne, and the second and third columns respectively represent the east and vertical directions, also in the XYZ reference frame.

It should furthermore be noted that the vector product is isotropic, that is to say independent of the reference frame.

When employing a vector product, the corrections to be made are also of great simplicity since the modulus of the vector product is proportional to the sine of the angle of the rotation which brings the vertically directed vector provided by the gyrometric device into coincidence with the vertically directed vector provided by the accelerometric device. Moreover, the direction of the vector product gives the axis of this rotation.

If the comparison consists in performing a vector product, further arrangements may be necessary. Specifically, a vector product being, by definition, perpendicular to each of the vectors of the product, its component is zero along the vertical direction, and if one wishes to estimate the vertical component of the drift of the gyrometric device, it is necessary to have further data available.

In one embodiment of the invention, to obtain an estimate of the vertical component of the drift of the gyrometric device, an orthogonal projection of the vector $\vec{\Omega}$ of components p, q, r is performed, which vector is provided by the gyrometers, after compensating for the drift (by the above-mentioned slaving), onto the vertical direction provided by the gyrometric device.

To obtain this projection, it is sufficient to perform the scalar product of the vector $\vec{\Omega}$ times the unit vector $\vec{U}_g$ of the vertical direction provided by the gyrometric device. This projected vector can be used, in an integral-return slaving, to compensate for the vertical component of the drift of the vector $\vec{\Omega}$ provided by the gyrometric device.

The scalar product $\vec{\Omega} \cdot \vec{U}g$ represents the drift of the gyrometer in the vertical direction only if the aircraft is in the rectilinear flight phase, that is to say if it is not turning about the vertical direction. Thus, in one embodiment, the turning phases are detected and the yaw slaving loop (making it possible to compensate for the vertical component of the drifts of the device) is opened during the turning phases.

Likewise, the accelerometric device provides a vector representing the acceleration due to gravity only during the phases of unaccelerated rectilinear flight. It is therefore preferable to open at least some slaving loops of the gyrometric device during the turning and/or acceleration phases. The roll slaving loop is opened in the turning phases and the pitch slaving loop is opened during the acceleration phases. During accelerated turns, it is preferable to open the roll loop, the pitch loop remaining closed.

In one variant, to obtain an estimate of the vertical component of the drift of the gyrometric device, instead of using yaw-wise slaving, use is made of slaving in terms of heading, that is to say that the direction of north expressed in the aerodyne reference frame, provided by the gyrometric device, is slaved to the magnetic north provided by an external sensor such as a magnetometer.

Preferably, the discrepancy in heading is represented by a vector whose direction corresponds to the vertical of the gyrometric device so that it does not come into conflict with the abovementioned vector product which, by definition, it perpendicular to the vertical direction provided by the gyrometric device. Accordingly, it is possible to use the vector product of a vector $\vec{U}_m$ representing the direction of magnetic north (provided by a magnetometer) times: a vector $\vec{b}_1$ representing the direction of north provided by the gyrometric device in the first column of the posture matrix. This vector product is then projected onto the vertical direction $\vec{b}_3$ provided by the gyrometric device.

The invention thus provides an apparatus for determining postures, in particular the attitude and the inclination of an aerodyne, comprising:

a strap-down gyrometer device providing the components of the vector of instantaneous rotation of the aerodyne in a reference frame tied to the aerodyne, means for calculating, from gyrometric measurements, a matrix of postures defining the orientation of the aerodyne with respect to the local geographical reference frame, accelerometers integral with the gyrometric device, and means for comparing data calculated from the accelerometers with data calculated from the gyrometers so as to provide corrections for compensating for the errors or drifts of the gyrometric device;

this apparatus is characterized in that the comparison is performed between a vertically directed vector $\vec{U}_g$ provided by the gyrometric device and a vertically directed vector $\vec{U}_a$ provided by the accelerometers.

The apparatus comprises, in one embodiment, means for calculating, from the accelerometric measurements, the direction of the vertical in a reference frame tied to the aerodyne. The vertically directed vectors are, for example, defined by their coordinates in a reference frame tied to the aerodyne.

The vertically directed vector provided by the gyrometric device may be obtained from the last column of the posture matrix.

Preferably, the vertically directed vectors have unit length.

In one embodiment, the means of comparison perform the vector product of the two vertically directed vectors.

The apparatus comprises a slaving loop of proportional type which, preferably, exhibits a gain limited to a predetermined maximum value.

In one embodiment, the apparatus comprises a slaving loop with integrator for compensating for drifts.

When the vector product of the two vertically directed vectors is performed, it is advantage for the apparatus to comprise a means for performing a correction along the vertical direction. In this case, the latter means comprises, for example, a means for calculating the projection, onto the vertical direction, of the instantaneous rotation vector provided by the gyrometric device, the vertical direction onto which the projection is performed being provided by the gyrometric device, and the instantaneous rotation vector which is projected being corrected by the slaving loop.

According to one embodiment, the vertically directed vector is provided, on the one hand, by the accelerometers and, on the other hand, from the velocity of the aerodyne as delivered, for example, by anemometric means.

In the latter case, the vertical direction is determined from the following equation:

$$\vec{F}_d/m = d\vec{V}/dt + \vec{\Omega} \cdot \vec{V} - \vec{F}_c/m,$$

$\vec{F}_d$ being the force of gravity, directed vertically, $\vec{V}$ the velocity vector of the aerodyne determined by the anemometric means, $\vec{\Omega}$ the vector of instantaneous rotation of the aerodyne determined by the gyrometric device, and $\vec{F}_c$ the resultant of the contact forces as determined by the accelerometers, and m the mass of the aerodyne.

In one embodiment, the apparatus comprises a means for slaving the gyrometric heading to the magnetic heading.

In the latter case, and when the vector product of the vertically directed vectors is performed, the slaving of the heading is determined from the correction vector satisfying the following equation:

$$\vec{\varepsilon}_c = [(\vec{U}_m \wedge \vec{b}_1)\vec{b}_3] = (\vec{U}_m \cdot \vec{b}_2) \cdot \vec{b}_3$$

in which equation $\vec{U}_m$ is a vector representing the direction of the terrestrial magnetic field, preferably of unit amplitude, and the vectors $\vec{b}_1, \vec{b}_2, \vec{b}_3$ are three vectors whose coordinates are provided by the columns of the posture matrix delivered by the gyrometric device.

According to one embodiment, the apparatus comprises closed loops for slaving the postures using the correction signals provided by the comparison means, and means for opening at least one loop outside of the rectilinear-flight and constant-velocity phases of the aerodyne.

In the latter case, the opening of the slaving loops may occur when the discrepancy between the vertically directed vector provided by the gyrometric device and the vertically directed vector provided by the accelerometers exceeds a predetermined value. In the event of a turn, for example, a roll slaving loop remains open, while a corresponding pitch slaving loop remains closed.

The rate of turn may be used to distinguish between rectilinear flight phases and different flight phases, and a roll slaving loop may be closed when the rate of turn is less in absolute value than a specified threshold.

When a loop is provided for compensating for the drifts, it is also possible to provide a slaving loop for correcting the gyrometric measurements along the vertical direction and this slaving loop comprises an integrator which is preferably common to the loop compensating for the drifts.

In one embodiment of this latter arrangement, the integrator comprises means making it possible to limit the mean slope of its output signal and means such that, at each instant, the output signal exhibits a discrepancy smaller than a threshold with respect to a linear-variation signal having a specified slope.

Other characteristics and advantages of the invention will become apparent with the description of certain of its modes of embodiment, this being given whilst referring to the appended drawings in which.

The exemplary embodiment of the invention which will be described in conjunction with the figures refers to an instrument or apparatus for determining the postures of an aircraft which comprises at least three gyrometers (not represented) whose parts have a fixed position with respect to the aircraft. The gyrometric device is, under these conditions, said to be of the. "strap-down" type. Stated otherwise, the gyrometers are sensors whose axes have well-defined positions with respect to the axes of the aircraft.

The apparatus also comprises accelerometers (not shown) for correcting the errors or drifts of the gyrometers. It is known, in fact, that the gyrometers provide data (the postures of an aircraft) with low noise but exhibiting drifts, or biases, entailing errors which increase with time.

To compensate for the drifts, use is made of accelerometers which give the components of the acceleration of the aerodyne corresponding to the resultant of the contact forces applying to this aerodyne. The expression "contact forces" is understood to mean the thrust and the aerodynamic forces (drag and lift). From these components provided by the accelerometers, it is possible to deduce the acceleration due to gravity, that is to say the vertical direction.

Specifically:

The general equation for the dynamics may be written:

$$\vec{F}_d/m + \vec{F}_c/m = \vec{\gamma}c \qquad (1)$$

In this formula $\vec{F}_d$ is the sum of the so-called "at a distance" forces applied to the aerodyne, that is to say gravity and inertia, $\vec{F}_c$ is the sum of the abovementioned contact forces, $\vec{\gamma}_c$ is the kinematic acceleration of the aerodyne and m the mass of the latter. The inertial forces are the Coriolis forces which here are negligible.

In the case of rectilinear flight at uniform velocity, $\vec{\gamma}_c=0$. The accelerometers then provide the components of the acceleration $\vec{g}$ due to gravity. The components of $\vec{g}$ are determined with respect to the axes of the sensors which the accelerometers constitute. Since these sensors are fixed to the fabric of the aircraft, it is easy to determine the components of $\vec{g}$ in the reference frame of the aircraft. The accelerometers therefore provide an indication regarding the orientation of the aircraft.

Furthermore, it may be observed that the accelerometers provide a component of the vector $\vec{g}$ only during phases of uniform rectilinear flight of the aircraft. In the other phases the vertical direction may be ascertained, on condition that other data are available, as will be seen hereinbelow.

Figure 1:
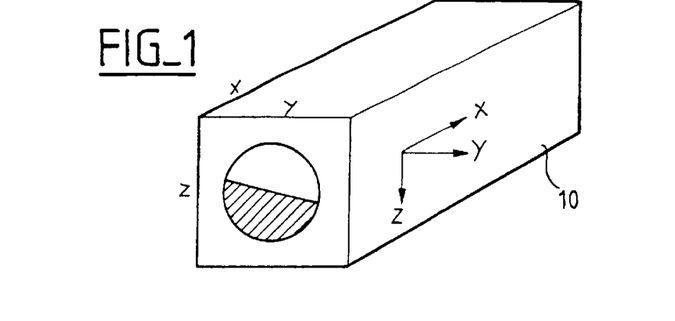
FIG. 1 is a diagram of a box, with its axes, of an apparatus according to the invention.

In the example, three gyrometers are provided arranged according to a triple right-angled trihedron colinear with the axes of the box 10 of the apparatus (FIG. 1). Hence, one gyrometer is provided along the x axis, one along the y axis and one along the z axis.

Conversely, only two accelerometers are provided, one along the x axis and the other along the y axis. This is because two components of the vector $\vec{\gamma} = \vec{g}$ are sufficient to determine the direction of the acceleration due to gravity vector $\vec{g}$, since because the norm g of the vector $\vec{g}$ is known, it is possible to deduce therefrom the component $\gamma_z$ along the Z axis from this norm and from the components $\gamma_x$ and $\gamma_y$ by virtue of the following formula:

$$\gamma_z = \sqrt{g^2 - \gamma_x^2 - \gamma_y^2} \qquad (2)$$

In known apparatuses, to correct the gyrometric data via the data provided by the accelerometers, there is provided a slaving loop in which the vector $\vec{\Omega}$ provided by the gyrometers is integrated to provide the postures. The accelerations are integrated by using the gyrometric postures to perform projections of change of reference frame and the velocities thus obtained are compared with a reference to deduce therefrom the corrections which are used to correct, in closed loop, the gyrometric data.

Unlike the processing performed by the conventional apparatus in which the data provided by the accelerometers are integrated, the invention consists in directly comparing the vertically directed vector provided by the accelerometers with the vertically directed vector provided by the posture matrix delivered by the gyrometric device.

In the preferred embodiment of the invention, this comparison is obtained by formulating the vector product $\vec{\epsilon}$ of the two vertically directed unit vectors $\vec{U}_a$ (vertical direction provided by the accelerometers) and $\vec{U}_g$ (vertical direction provided by the gyrometric device), that is to say:

$$\vec{\epsilon} = \vec{U}_a \wedge \vec{U}_g \qquad (3)$$

The apparatus according to the invention is therefore especially simple since, on the one hand, it is not necessary to integrate the data provided by the accelerometers and, on the other hand, the vectors $\vec{U}_a$ and $\vec{U}_g$ are in the same reference frame which is that of the sensors, that is to say of the box 10.

Furthermore, the vector $\vec{\epsilon}$ can be utilized to make the correction since its norm is sin á, á being the angle between the vectors $\vec{U}_g$ and $\vec{U}_a$. The correction consists in rotating the vector $\vec{U}_g$ by an angle á in such a way as to bring it into the direction of the vector $\vec{U}_a$. This vector $\vec{\epsilon}$ is used in a slaving loop which makes the vector $\vec{U}_g$ converge towards the vector $\vec{U}_a$. This convergence is achieved with a rate of rotation equal to the norm of the vector $\vec{\epsilon}$ and hence proportional (if the angle á is small) to the angular discrepancy between the vectors $\vec{U}_g$ and $\vec{U}_a$.

Moreover, the correction is isotropic, that is to say independent of the reference frame in which one is located. However, the slaving calculations will be performed in the sensor reference frame.

The vector $\vec{U}_g$ is provided by the last column of the matrix of postures of the gyrometric device.

A slaving circuit of an apparatus in accordance with the invention will now be described in conjunction with FIG. 2.

This slaving circuit comprises: an integration calculation means, or integrator 12, providing a quaternion of postures, a means 14 for extracting the matrix B of postures from the quaternions, and a block 16 which extracts from the matrix B the last column which represents the vector $\vec{U}_g$, that is to say the vertically directed unit vector in the XYZ reference frame of the box 10.

The vector $\vec{U}_g$ provided by the block 16 is applied to the first input of a vector product block 18 whose second input receives the unit vertical vector $\vec{U}_a$ provided by the accelerometric device. Thus, the block 18 delivers the vector $\vec{\epsilon}$ on its output.

To make the vector $\vec{U}_g$ converge towards the vector $\vec{U}_a$, there is provided a first proportional slaving loop comprising an amplifier (or attentuator) 20 with coefficient $k_1$.

This proportional slaving is supplemented with integrator 22 slaving making it possible to estimate and compensate for the drifts of the gyrometric device. There is therefore provided a second loop with a second amplifier (or attenuator) 24 with coefficient $k_2$.

The signal from the first loop is provided on a first input − (minus) of a subtractor 26 whose output is linked to the input of the integrator 12 and which comprises a + (plus) input 28 receiving the vector $\vec{\Omega}_g$ provided by the three gyrometers and a second input − connected to the output of the integrator 22 in series with the amplifier 24.

In each of the slaving loops, in series with the amplifiers 20 and 24, there are provided interrupters, 32 and 34 respectively, which are open during the dynamic phases of flight. Specifically, during these phases, the accelerometers no longer provide the components of the acceleration due to gravity. However, during these openings of the slaving loops, the drift of the gyrometers continues to be compensated for by virtue of the output of the integrator 22.

Figure 2:
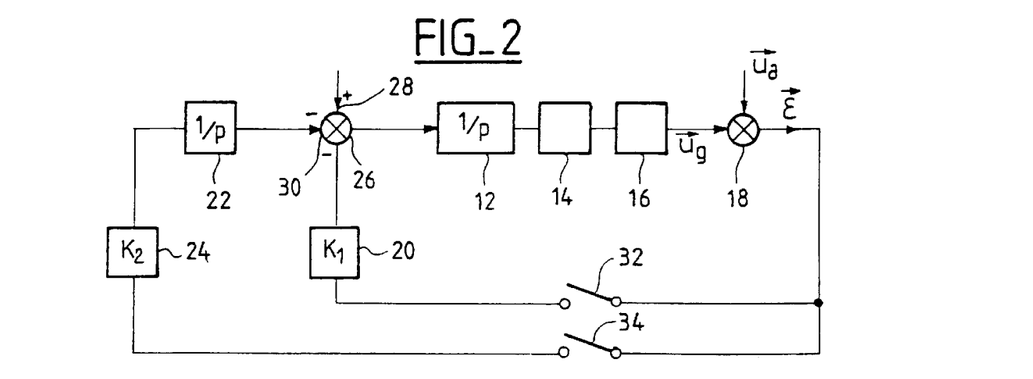
FIG. 2 is a diagram of a slaving loop of an apparatus in accordance with the invention.

It should be noted that the diagram represented in FIG. 2 is a vectorial representation. Each arrowed line represents a vector item of dimension 3. There are therefore, in practice, three slaving loops, one for each component. The most appropriate reference frame is the reference frame (X, Y, Z) tied to the aerodyne.

To detect the dynamic phases during which the slaving loops must be open, the components of the vector $\vec{\epsilon}$ are compared with thresholds. If the thresholds are exceeded, the loop or loops is or are opened. As will be seen later on, a slaving loop in one direction may be open, whilst other slaving loops remain closed. Be that as it may, it is necessary to carefully select the instants of opening so as not to falsify the slaving.

It is also necessary to avoid excessive drifting of the vector $\vec{U}_g$ during the openings of loops. Means making it possible to perform the openings of the slaving loops at correctly chosen instants will be described later, together with safety features making it possible to avoid divergences of the vector $\vec{U}_g$ during the openings of the loops.

A slaving circuit which uses slaving loops similar to those represented in FIG. 2 and, in addition, another slaving loop making it possible to compensate for the vertical component of drift $d\vec{\Omega}_g$ will now be described in conjunction with FIG. 3.

Specifically, the vector product $\vec{\epsilon}$ being, by definition, perpendicular to the vector $\vec{U}_g$, its component in the vertical direction is zero. This vector product therefore does not make it possible to estimate the vertical component of the drift $d\vec{\Omega}_g$ if the aircraft maintains a constant posture.

This compensation is required in order to be able correctly to obtain the three components of the instantaneous rotation $\vec{\Omega}$. Furthermore according to one aspect of the invention, the vertical component of the instantaneous rotation constituting the rate of turn, this component serves to distinguish the rectilinear phases from the turning phases so as to open, at correctly chosen moments, certain of the slaving loops.

Figure 3:
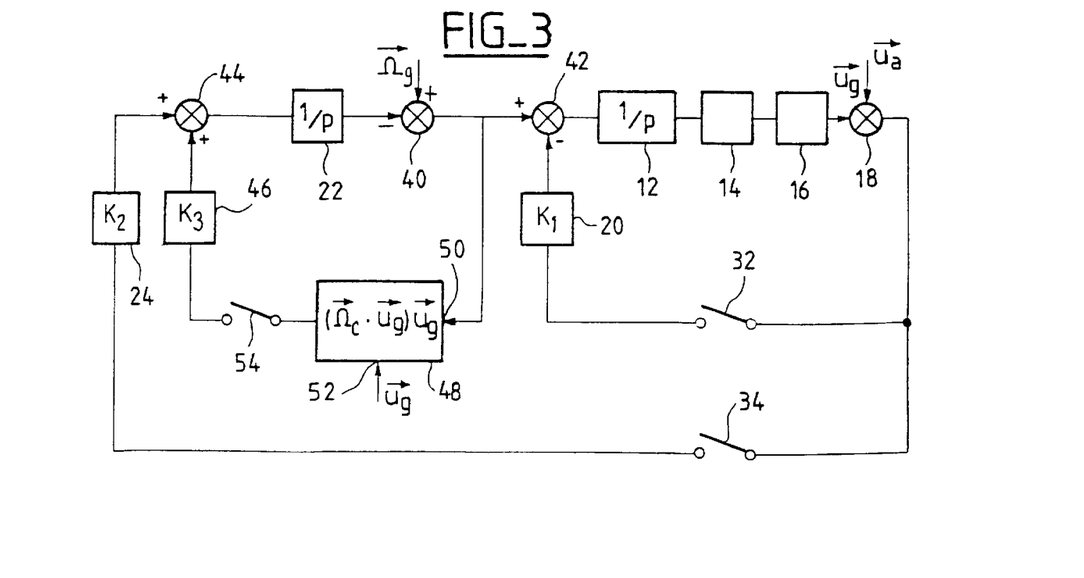
FIG. 3 is a diagram similar to that of FIG. 2, but for a variant.

In the embodiment represented in FIG. 3, an orthogonal projection of the vector $\vec{\Omega}_c$, that is to say the instantaneous rotation vector compensated for the estimated drifts, is performed onto the direction $\vec{U}_g$. For this purpose, the scalar product $\vec{\Omega}_c \cdot \vec{U}_g$ is performed, and the vector $(\vec{\Omega}_c \cdot \vec{U}_g) \cdot \vec{U}_g$ is used to perform the yaw slaving.

To avoid any confusion, the angular acceleration vector without compensation has been denoted $\vec{\Omega}_g$ and the same vector with compensation $\vec{\Omega}_c$.

In FIG. 3, the elements corresponding to those of FIG. 2 bear the same reference digits.

In this embodiment, the vector $\vec{\Omega}_g$ is applied to the + input of a subtractor 40 whose output is linked to the + input of another subtractor 42 whose − input receives the output of the amplifier 20 ($k_1$). Furthermore, the − input of the subtractor 40 is linked to the output of an adder 44 by way of the integrator 22.

A first input of the adder 44 is linked to the output of the amplifier 24 ($k_2$), whilst the second input of this adder is linked to the output of an amplifier 46 of gain $k_3$ located in the yaw slaving loop.

This yaw slaving loop comprises a block 48 which calculates the components of the vector $(\vec{\Omega}_c \cdot \vec{U}_g) \cdot \vec{U}_g$. For this purpose, this block 48 presents an input 50 receiving the vector $\vec{\Omega}_c$ ($\vec{\Omega}_g$ compensated for the drift, owing to the slaving loop with amplifier 24 and integrator 22), and a second input 52 receiving the vector $\vec{U}_g$ provided by the output of the block 16. The output of the block 48 is linked to the input of the amplifier 46 by way of an interrupter 54.

Given that the slaving loop with amplifier 46 must compensate for a drift, it comprises an integrator, and the latter is the integrator 22, which also forms part of the loop with amplifier 24.

The scalar product $\vec{\Omega}_c \cdot \vec{U}_g$ represents the vertical component of the drift of the gyrometric device on condition that the aircraft does not turn about the vertical. This is why the interrupter 54 is open during turns.

A number of arrangements making it possible to correctly control the opening of the interrupters 32, 34 and 54 of the slaving circuits during certain transient phases for which these circuits (or some of them) may not operate correctly will now be described, in particular in conjunction with FIGS. 4 to 6.

Consideration will firstly be given to the interrupter 32 (FIGS. 2 and 3) of the proportional type slaving circuit.

This interrupter 32 must be open during accelerations or turns since, in this case, the vector $\vec{U}_a$ provided by the accelerometers does not represent the true vertical direction. To detect these phases, one detects the angular discrepancies between the vectors $\vec{U}_g$ and $\vec{U}_a$ which is represented by the components of the vector $\vec{\epsilon} = \vec{U}_a \wedge \vec{U}_g$.

To limit the openings of the interruptor 32, a saturation characteristic is conferred on the amplifier 20. This characteristic is represented by FIG. 4, which is a chart showing, for a component (x for example), the variation in the correction c plotted as ordinate, of the amplifier 20 as a function of the component $\epsilon_x$ of the vector $\vec{\epsilon}$, this component $\epsilon_x$ being plotted as abscissa. This variation is represented by a line 60 exhibiting: a linear zone of slope $K_1$ represented by a straight line segment 62 passing through the origin O, saturation zones represented by the straight line segments 64 and 66, parallel to the abscissa axis, and cut-off zones beyond the abscissae $\epsilon_{xc}$ and $-\epsilon_{xc}$. When the discrepancy $\epsilon_x$ exceeds, in absolute value, the value $\epsilon_{xc}$, the interrupter 32 is opened.

The saturation limits the signal applied to the − input of the subtractor 42. This limit of the signal corresponds to the maximum allowable for the compensation for the drifts. Such a characteristic is a compromise between a proportional correction and the open loop. This saturation characteristic attenuates the effect of the errors of $\vec{\epsilon}$ on the accuracy of $\vec{U}_g$, without having to cut off the slaving.

To control the opening of the interrupter 34, the norms of $\vec{\epsilon}$ and of $\vec{\Omega}_c$ are compared with thresholds so as to detect the movements of the aerodyne, when going to the turning or acceleration phase.

The interrupter 54 is open when the rate of turn exceeds a threshold. This rate of turn is represented by the scalar product $\vec{\Omega}_c . \vec{U}_g$.

An arrangement which makes it possible to limit the risk of divergence during the openings of the interrupter $32_x$ during the turning phases will now be described in conjunction with the charts of FIGS. 5 and 6.

Figure 4:
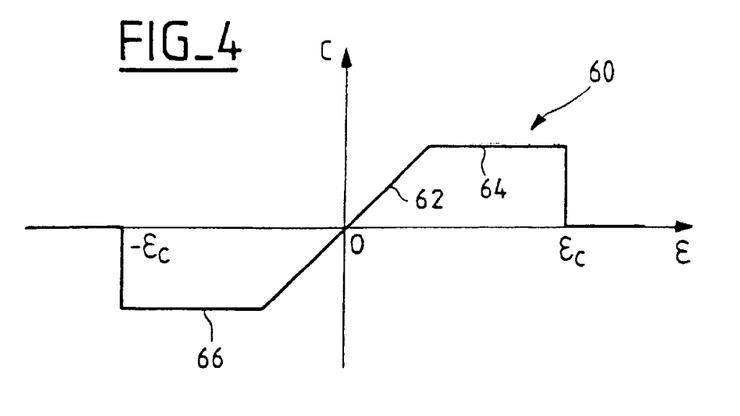
FIGS. 4, 5 and 6 are charts illustrating modes of operation, in accordance with the invention, of the slaving circuits represented in FIG. 2 or FIG. 3.
Figure 5:
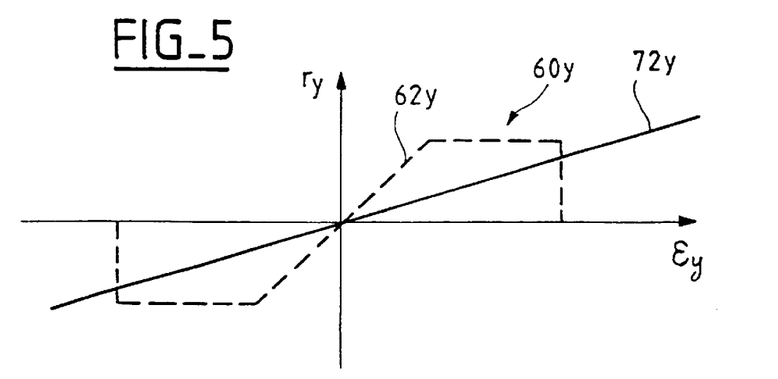

This arrangement consists in keeping the interrupter $32_y$ closed from the moment at which the interrupter $32_x$ is opened, regardless of $\epsilon_y$, while replacing, in this case, the profile of the amplifier $20_y$ as described with FIG. 4 by that described with FIG. 5, that is to say with a smaller and continuous slope, with no threshold.

Stated otherwise, the gain $k_{1y}$ of the amplifier $20_y$ exhibits a smaller value during the turning phases. In the chart of FIG. 5, the component $\epsilon_y$ of the vector $\vec{\epsilon}$ has been plotted as abscissa, and the signal $r_y$ at the output of the amplifier $20_y$ as ordinate. The line $60_y$ represented by broken lines corresponds to the line 60 of FIG. 4. This variation of $r_y$ as a function of $\epsilon_y$ occurs during the phases of rectilinear flight without acceleration, the interrupter $32_x$ of the roll slaving loop being closed in this case. Conversely, during the turning phases, the interrupter $32_x$ is open and the interrupter $32_y$ remains closed. However, as represented by the line $72_y$, the characteristic of the amplifier $20_y$ is modified in this situation: the slope of the straight line $72_y$ is less than the slope of the straight line $62_y$.

Figure 6:
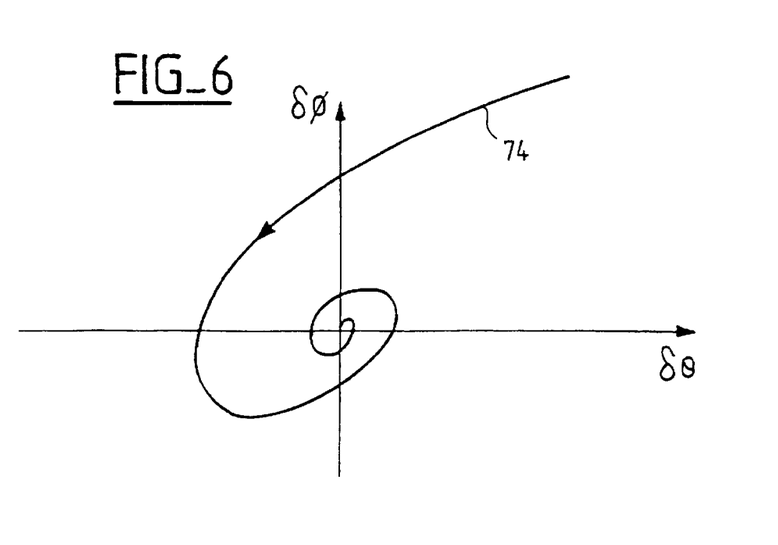

With this arrangement, when the aircraft turns about the vertical, the errors in pitching and rolling posture converge to zero along a spiral as represented by FIG. 6, if the velocity of the aerodyne remains constant.

Thus, in the steady state, zero pitch and roll errors are obtained.

In the chart of FIG. 6, the error δφ (roll) has been plotted as ordinate and the error δθ (pitch) as abscissa. The spiral curve 74 converges towards zero errors in φ (roll) and in θ (pitch).

In the case of a turn, if longitudinal (x axis) accelerations or decelerations occur, the vertical reference $\vec{U}_a$ provided by the accelerometers becomes false in terms of pitch also. This error Δθ in pitch on the vertically directed vector $\vec{U}_a$ is manifested as an error in the roll φ. In the steady state, this error is proportional to Δθ, K₁ and 1/Ω, Ω being the rate of turn and as a zero error for θ. The reduction in the gain of the amplifier thus renders the device less sensitive to correction errors due to longitudinal accelerations.

Another arrangement which makes it possible to improve the reliability of the distinction between the rectilinear phases and the turning phases in such a way as to keep the interrupter $32_x$ closed when a rectilinear flight phase is detected will now be described.

It was seen that the keeping of the interrupters 32 open or closed depends on the comparison of each component of $\vec{\epsilon}$ with a threshold. It was also seen that, in order to distinguish between the rectilinear flight phases and the turning phases, it was possible also to use the scalar product $\vec{\Omega}_c . \vec{U}_g$ which represents the rate of turn. According to the invention, the opening of $32_x$ when $\epsilon_x$ exceeds its cut-off threshold is disabled if the calculated rate of turn indicates that no turn is in progress. In this case, the profile of the amplifier $20_y$ as represented in FIG. 4 is replaced with a linear profile such as the straight line 72 in FIG. 5. However, the slope of this straight line is greater than the slope of the straight line 62. In this way, the vertical direction of the gyrometric device is brought into the true vertical direction $\vec{U}_a$ provided by the accelerometers, in the case where, on exiting a turn, $\epsilon_x$ would exit its span of capture (zone $-\epsilon_c$ $+\epsilon_c$ in the chart of FIG. 4) following a divergence during the open-loop phase.

An embodiment of the integrator 22 used to estimate the drifts will now be described in conjunction with FIGS. 7 and 8.

It is recalled here that the integrator 22 must be able to compensate for the drifts in open loop, that is to say when the slavings are disabled.

The integrator 22 takes account of the characteristics of the drifts of the gyrometric device. In particular, the movements in the drifts as a function of time being limited by a maximum slope characteristic of the gyrometers, the output slope of the integrator 22 is also limited.

Figure 7:
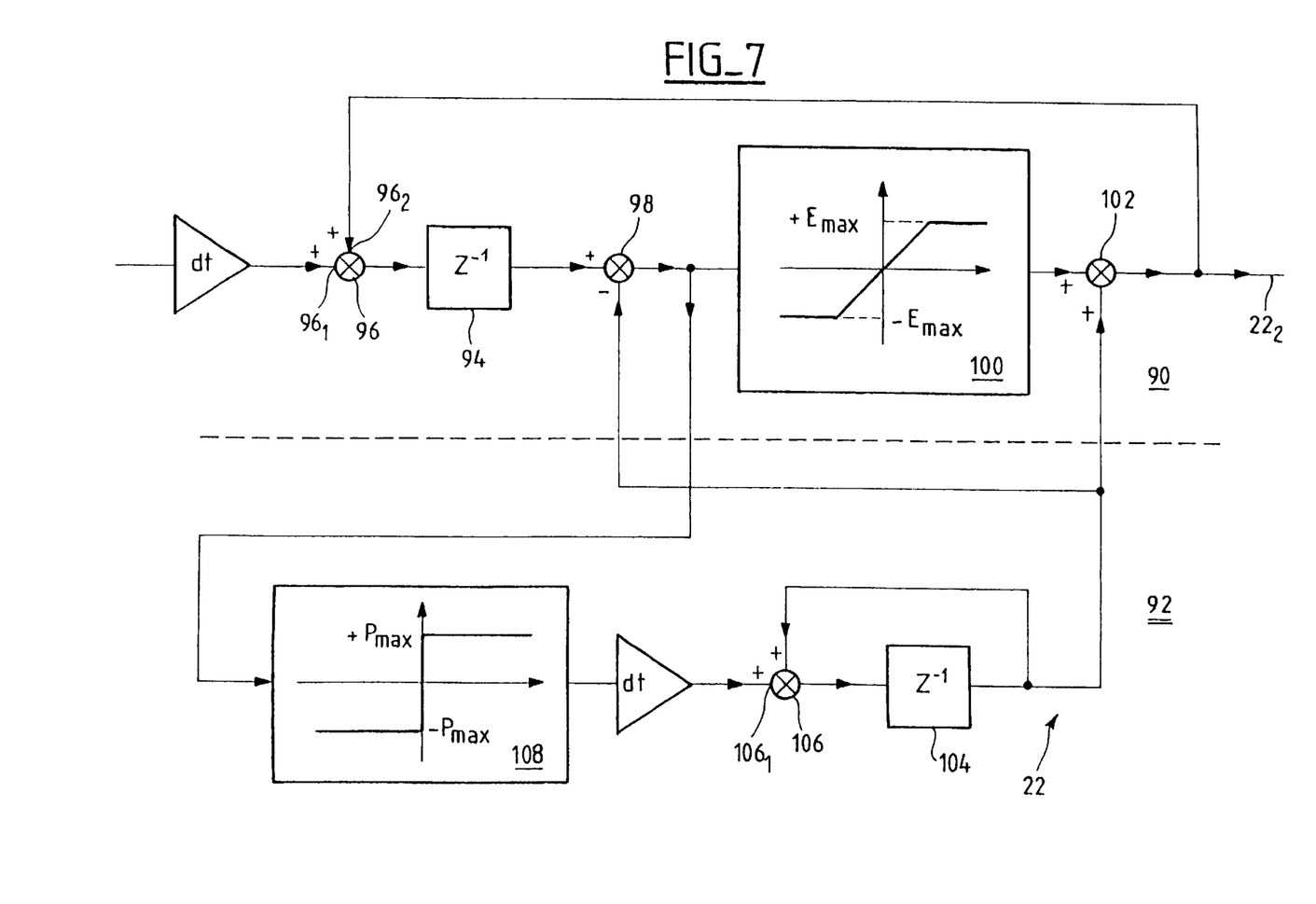
FIG. 7 is a diagram of an embodiment of integrator used in the embodiment represented in FIG. 2 or FIG. 3.

FIG. 7 represents a sampled system of period dt. Each block $Z^{-1}$ is a delay, this signifying that the output is delayed by one period with respect to the input.

In the example represented in FIG. 7, the integrator 22 comprises two stages, 90 and 92 respectively. The first stage comprises a delay 94 whose input is linked to the output of an adder 96 one input $96_1$ of which constitutes the input of the integrator 22 and the other input $96_2$ of which is linked to the output $22_2$ of the integrator 22.

The output of the delay 94 is linked to the + input of a subtractor 98 whose output is linked to the input of a discrepancy saturator 100 limiting the signals between two values $+E_{max}$ and $-E_{max}$ of opposite sign. The output of the saturator 100 is linked to an input of an adder 102 whose output is linked to the output $22_2$ of the integrator 22.

The second stage 92 also comprises a delay 104 whose output is linked to the second input of the adder 102 and whose input is linked to the output of an adder 106 an input $106_1$ of which is linked to the output of a slope saturator 108 whose input is linked to the output of the subtractor 98 upstream of the discrepancy saturator 100.

The output of the delay 104 is also connected to the – input of the subtractor 98 and to the second input of the adder 106.

The slope saturator 108 makes it possible to limit the slope of the second stage 92 to two maximum slopes of opposite signs $P_{max}$, $-P_{max}$.

The first stage 90 directly integrates the input signal. Its output is limited by the saturator 100 in a zone of fixed width whose center is the output signal from the second stage 92.

The output signal from the second stage varies in accordance with two opposite maximum slopes $P_{max}$ and $-P_{max}$ determined by the saturator 108.

The second stage 92 serves to limit the mean slope of the integrated signal, whilst the output of the integrator 22 is provided by the first stage.

Figure 8:
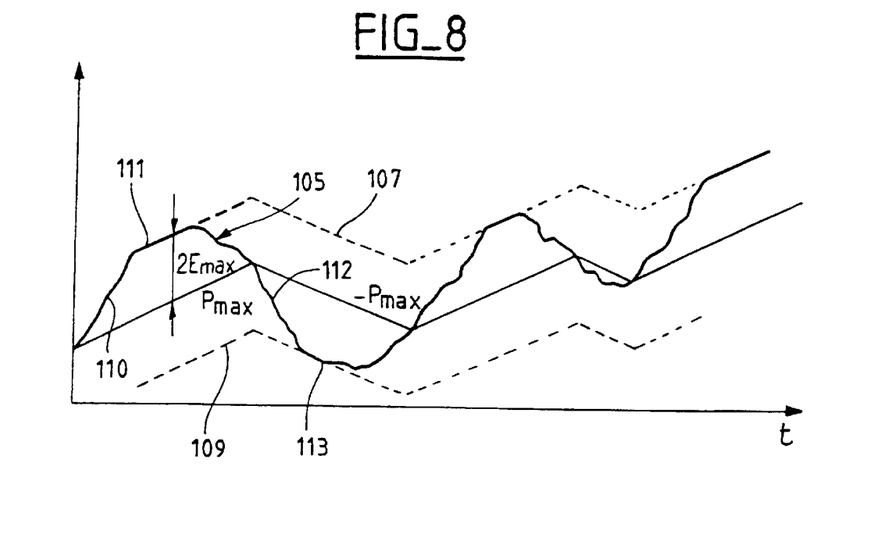
FIG. 8 is a chart giving, by way of example, a mode of operation of the integrator represented in FIG. 7, and FIG. 9 corresponds to a variant of FIG. 3.

The variations in the output signal are represented in FIG. 8. It may be seen that the output signal 105 is confined between two broken lines 107 and 109 all of whose segments are parallel to one another. Each of the segments of the lines 107 and 109 having alternately a slope $P_{max}$ and a slope $-P_{max}$. As long as the discrepancy between the signals of the two stages 90 and 92 remains less than the maximum discrepancy $2E_{max}$ (portions 110, 112, etc. of curve 105), the estimator operates linearly, that is to say it operates as a simple integrator. The dynamic properties of the slaving about the zero value are thus preserved. Conversely, when the discrepancy exceeds the maximum discrepancy determined by the saturator 100, the output of the estimator is "clamped" so that its signal now varies no more than the maximum permitted slope $P_{max}$. This clamping is represented by the segments 111, 113, etc. in FIG. 8.

To summarize, the integrator 22 represented in FIG. 7 makes it possible to limit the mean rate of variation of the estimation signal and not to limit the instantaneous rate of this estimation signal. These characteristics make it possible to circumvent the difficulties which could result from flights with numerous turns and hence with frequent openings of slaving loops.

In all the examples described above it has been pointed out that it was necessary to take precautions during non-rectilinear and/or accelerated phases of flight, since the correction provided by the accelerometers cannot be used during these phases. This is because in the case of turning or accelerated flight, the accelerometric measurements no longer provide the true vertical related to gravity but the apparent vertical related to the lift of the aerodyne. However, in equation (1) mentioned above, the kinematic acceleration vector $\vec{\gamma}_c$ can be determined from the velocity $\vec{V}$ and the instantaneous rotation $\vec{\Omega}$ according to the classical formula below:

$$\vec{\gamma}_c = d\vec{V}/dt + \vec{\Omega} \wedge \vec{V} \qquad (4)$$

In this formula, the vectors $\vec{V}$ and $\vec{\Omega}$ as well as the acceleration $d\vec{V}/dt$ are considered in the aerodyne reference frame.

It may thus be seen that if the vector $\vec{V}$ in the aerodyne reference frame is known, then $\vec{\gamma}_c$ can be determined since $\vec{\Omega}$ is provided by the gyrometers. Stated otherwise, if the vector $\vec{V}$ can be determined, the gyrometric data can be corrected in closed loop, even during turns or acclerations.

The velocity of the aerodyne, $\vec{V}$, can be determined by an anemometer. Thus, when the aerodyne is flying without sideslip at zero or low angle of attack, the velocity in the aerodyne reference frame is a vector $\vec{V}$ whose component $V_x$ is the velocity provided by the anemometer and whose components $V_y$ and $V_z$ are zero (given that there is no sideslip and that the angle of attack is zero).

An anemometer can thus be used either to keep the slaving loops permanently closed, or to limit the periods of opening of these loops.

An arrangement which can be used in combination with the use of the velocity provided by an anemometer to correct the errors and drifts of the gyrometers will now be described in particular in conjunction with FIG. 9.

This arrangement starts from the finding that in the rectilinear flight phase, the vertical reference is very sensitive to errors in the vector $\vec{\Omega}$, that is to say to errors in estimating drifts. Stated otherwise, the accuracy in the vertically directed vector depends greatly on the errors in the vector $\vec{\Omega}$; furthermore, this accuracy worsens as the velocity increases. The estimation of the yaw drift, which was described with FIG. 3, is not sufficiently accurate to compensate for this impairment of accuracy.

Thus, according to another arrangement of the invention, the yaw slaving is replaced with a slaving of the gyrometric heading to the magnetic heading provided by a magnetometer. This slaving is similar to that of the postures, but requires no opening of a slaving loop during turns. This slaving in heading makes it possible, of course, to limit the heading errors and improve the estimate of the yaw drift. The accuracy of the calculation of the true vertical in equation (4) is improved when the anemometric velocity is used. It is also possible to improve the detection of the rectilinear phases of flight. Finally, the quality constraints on the yaw gyrometer are less severe, thus allowing the use of a more economical yaw gyrometer.

On embodiment of this arrangement of the invention consists in providing a vertically directed heading correction vector $\vec{\epsilon}_c$ so that this correction does not come into conflict with that provided by the vector $\vec{\epsilon}$ mentioned above which is, by construction, in the horizontal plane (vector product of the vertical directions provided by the gyrometric device and by the accelerometers).

The heading discrepancy can be obtained by virtue of a magnetometer or similar apparatus which provides the components of the terrestrial magnetic field $\vec{B}$. Under these conditions, the heading discrepancy is calculated according to the formula below:

$$\vec{\epsilon}_c = [(\vec{U}_m \wedge \vec{b}_1) \cdot \vec{b}_3] \cdot \vec{b}_3 = (\vec{U}_m \cdot \vec{b}_2) \cdot \vec{b}_3 \qquad (5)$$

In this formula, the vector $\vec{U}_m$ is the unit vector in the direction of magnetic north and $\vec{b}_1$, $\vec{b}_2$ and $\vec{b}_3$ are the three vectors provided by each of the three columns of the posture matrix B with:

$$B = \begin{bmatrix} b_{11} & b_{12} & b_{13} \\ b_{21} & b_{22} & b_{23} \\ b_{31} & b_{32} & b_{33} \end{bmatrix} = \begin{bmatrix} \vec{b}_1 & \vec{b}_2 & \vec{b}_3 \end{bmatrix} \qquad (6)$$

In this case, the vector $\vec{b}_1$ is the posture vector in the north direction, the vector $\vec{b}_2$ is the posture vector in the east direction and the vector $\vec{b}_3$ is the posture vector in the vertical direction.

Equation (5) signifies that one performs the vector product of $\vec{U}_m$ times $\vec{b}_1$ and that the resultant vector is projected onto the vertical given by $\vec{b}_3$.

Figure 9:
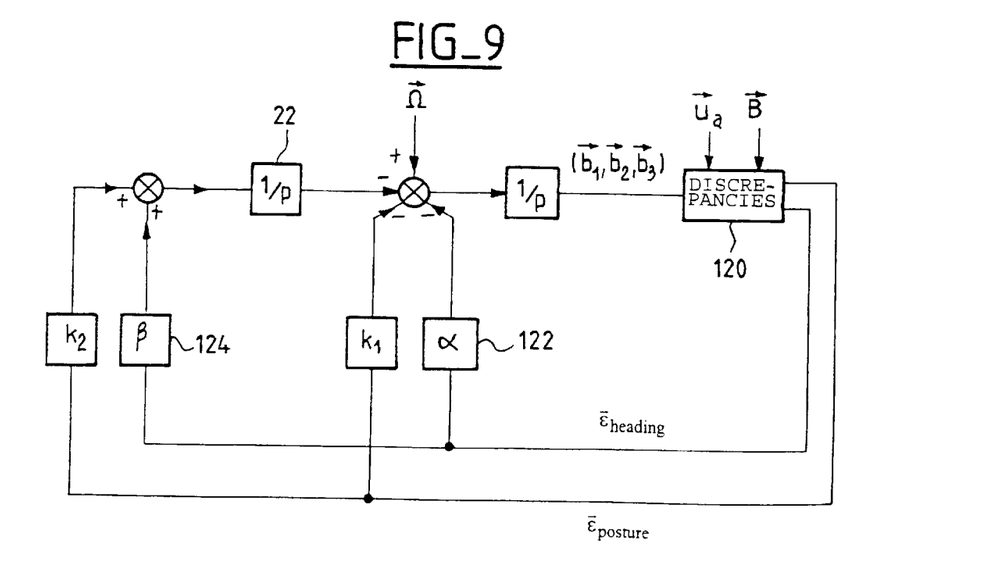

FIG. 9 represents, in a simplified manner, the slaving loops used in this embodiment where a heading correction is made. This FIG. 9 is similar to that of FIG. 3. However, as already indicated hereinabove, the yaw slaving is replaced with the heading slaving. It may be seen that the integrator 22 is common to the posture and heading slaving loops. A block 120 represents the facility which determines the vectors $\vec{\epsilon}_c$ of posture discrepancy (obtained from the vector product of the vertically directed vectors provided, on the one hand, by the gyrometric device and, on the other hand, by the accelerometers) and $\vec{\epsilon}_c$ the heading discrepancy vector. This vector $\vec{\epsilon}_c$ is obtained from the posture matrix and from the terrestrial magnetic field vector $\vec{B}$.

There is provided, in the heading slaving, a correction of proportional type with a gain á (amplifier 122) and a correction of integral type of gain β (amplifier 124), the latter correction employing the same integrator 22 as the posture slaving of gain $k_2$.

Regardless of the embodiment, the apparatus comprises, in a conventional manner, means of reinitialization conventionally dubbed "caging". This reinitialization is triggered manually by the pilot in order to cause the postures to converge rapidly so that the vertical direction determined by the gyrometric device corresponds to the true vertical. This function can be used in flight at constant rectilinear velocity, or in any phase of flight, if the data provided by an anemometer, or the like, are combined with the data provided by the accelerometers.

To ensure this reinitialization function, in one embodiment of the invention, the gains of the amplifiers of the proportional slaving loops are bounded above for a specified time, for example three minutes, over the three axes and, during this period, the slaving loops are held in the closed state and the saturations are disabled. The integrators being clamped, the servocontrol loops make it possible to cause the posture errors to rapidly converge so that they can re-enter the span of capture of these slavings.

What is claimed is:

1. An apparatus for determining attitude and inclination postures of an aerodyne in a local geographical reference frame, comprising:
    a strap down gyrometer device comprising at least three gyrometers and configured to provide components of an instantaneous rotation vector of the aerodyne in a reference frame tied to the aerodyne;
    a calculator configured to calculate from the gyrometers a matrix of postures ($\vec{b}_1$, $\vec{b}_2$, $\vec{b}_3$), said matrix comprising components of a vertically directed vector $\vec{U}_g$ in said reference frame tied to the aerodyne;
    accelerometers integral with said gyrometer device and configured to provide components of a vertically directed vector $\vec{U}_a$ representing a vertical direction in said reference frame tied to the aerodyne when the aerodyne is moving with an unaccelerated linear motion;
    a comparator configured to compare the vertically directed vector $\vec{U}_g$ provided by the gyrometer device to the vertically directed vector $\vec{U}_a$ provided by the accelerometers, and to produce an error signal to provide corrections for compensation of errors or drifts of the gyrometer device.

2. The apparatus as claimed in claim 1, wherein said components of the vector $\vec{U}_g$ are derived from column ($\vec{b}_3$) of the posture matrix.

3. The apparatus as claimed in claim 1, wherein at least one of the vertically directed vectors $\vec{U}_a$ and $\vec{U}_g$ has a unit length.

4. The apparatus as claimed in claim 1, wherein the comparator is further configured to calculate a vector product of the two vertically directed vectors $\vec{U}_a$ and $\vec{U}_g$.

5. The apparatus as claimed in claim 1, further comprising:
    a proportioned slaving loop configured to receive said error signal and provide a correction signal for the instantaneous rotation vector provided by the gyrometer device.

6. The apparatus as claimed in claim 5, wherein the proportioned slaving loop exhibits a gain limited to a predetermined maximum value.

7. The apparatus as claimed in claim 6, further comprising:
    a slaving loop having an integrator configured to compensate for drifts, said slaving loop configured to receive said error signal and provide a correction signal for the instantaneous rotation vector provided by the gyrometer device.

8. The apparatus as claimed in claim 7, further comprising:
    a vertical direction correction device configured to perform a correction of the instantaneous rotation vector along the vertical direction.

9. The apparatus as claimed in claim 8, wherein the vertical direction correction device is configured to calculate a projection, onto the vertical direction as provided by the gyrometer device, of said instantaneous rotation vector provided by the gyrometer device and an instantaneous rotation vector corrected by the slaving loop.

10. The apparatus as claimed in claim 7, wherein the slaving loop is configured to correct gyrometric measurements along the vertical direction and is configured to compensate for drifts of the gyrometer device.

11. The apparatus as claimed in claim 10, wherein said integrator of the slaving loop comprises:
    a slope saturator configured such that a mean slope of an output signal of the integrator is limited; and
    a discrepancy saturator configured such that, at each instant, said output signal exhibits a discrepancy smaller than a threshold with respect to a linear-variation signal having a specified slope.

12. The apparatus as claimed in claim 1, wherein the accelerometers are configured to provide the vertically directed vector $\vec{U}_a$ from a velocity of the aerodyne derived by an anemometric device.

13. The apparatus as claimed in claim 12, wherein the vertical direction is determined from the following equation:

$$\vec{F}_d/m = d\vec{V}/dt + \vec{\Omega} \wedge \vec{V} - \vec{F}_c/m$$

$\vec{F}_d$ being a force of gravity, directed vertically, $\vec{v}$ a velocity vector of the aerodyne, $\vec{\Omega}$ the instantaneous rotation vector of the aerodyne determined by the gyrometric device, $\vec{F}_c$ a resultant of contact forces as determined by the accelerometers, and m a mass of the aerodyne.

14. The apparatus as claimed in claim 1, further comprising:
    a slaving loop configured to slave a gyrometric heading to a magnetic heading.

15. The apparatus as claimed in claim 14, wherein the slaving loop is configured to determine a gyrometric heading from a correction vector satisfying the following equation:

in which equation $\vec{U}_m$ is a vector representing the direction of magnetic north, and the vectors $\vec{b}_1$, $\vec{b}_2$ and $\vec{b}_3$ are three vectors whose coordinates are provided by columns of the posture matrix delivered by the gyrometer device.

16. The apparatus as claimed in claim 1, further comprising:
    at least one loop configured to slave said postures, said at least one loop connected to the comparator and providing correction signals for said instantaneous rotation vector provided by the gyrometer device; and an interruptor configured to open one of said at least one loop when said aerodyne is outside of rectilinear-flight and constant-velocity phases.

17. The apparatus as claimed in claim 16, wherein said interrupter opens said one of the at least one loop when a discrepancy between the vertically directed vector $\vec{U}_g$ and the vertically directed vector $\vec{U}_a$ exceeds a predetermined value.

18. The apparatus as claimed in claim 16, wherein the interrupter is configured to open a roll slaving loop during a turn of the aerodyne while a corresponding pitch slaving loop remains closed during the turn.

19. The apparatus as claimed in claim 16, wherein the comparator is configured to determine a rate of turn used to distinguish between the rectilinear flight phases and other flight phases such that a roll slaving loop is closed when the rate of turn is less in absolute value than a specified threshold.

* * * * *